United States Patent [19]

Day

[11] 3,648,898
[45] Mar. 14, 1972

[54] SENSOR AND TRIGGER MECHANISM
[72] Inventor: Edward G. Day, Rochester, N.Y.
[73] Assignee: General Motors Corporation, Detroit, Mich.
[22] Filed: Jan. 6, 1971
[21] Appl. No.: 104,255

[52] U.S. Cl. ..........................................222/5
[51] Int. Cl. ..........................................B67b 7/24
[58] Field of Search ................222/5, 80, 82, 83; 180/91; 9/316, 318, 320, 324

[56] References Cited

UNITED STATES PATENTS

| | | | |
|---|---|---|---|
| 1,921,452 | 8/1933 | Bronander | 222/5 X |
| 2,468,369 | 4/1949 | Jones | 222/5 X |
| 2,593,552 | 4/1952 | Folkman | 222/82 UX |
| 2,853,126 | 9/1958 | Corlet | 222/5 |
| 3,084,705 | 4/1963 | Fever | 222/5 X |
| 3,266,668 | 8/1966 | Davis | 9/318 X |
| 3,494,506 | 2/1970 | Fujimoto | 9/318 X |
| 3,591,877 | 7/1971 | Schuler | 222/5 |

Primary Examiner—Robert B. Reeves
Assistant Examiner—John P. Shannon, Jr.
Attorney—W. E. Finken and Herbert Furman

[57] ABSTRACT

A sensor and trigger mechanism includes a pressure vessel containing fluid under pressure and having an outlet secured to a cylindrical support and sealed by a rupturable diaphragm. An axial guide pin on the support slidably mounts a headed penetrator pin. The head of the penetrator pin and the support seat the ends of a hollow frangible glass cylinder. A compression spring seating between the support and the head of the penetrator pin biases the pin toward the diaphragm. A ball of predetermined weight is seated on a pedestal and held against movement by a spring biased lever engaging the ball diametrically opposite the seat. A torsion spring is mounted on the support and includes a swingable U-shaped lever arm. The head of a fragmentor pin is slotted and receives the bight portion of the lever arm to pivotally and slidably mount the fragmentor pin on the lever arm. A pair of extensions of the lever engage the bight portion of the lever arm to either side of the head of the fragmentor pin to detent the lever arm of the torsion spring and also slidably locate the fragmentor pin on the bight portion of such arm to align the fragmentor pin with a guide on the support. When the ball moves off the seat under an acceleration pulse of predetermined amplitude and time, the lever releases the lever arm and the torsion spring drives the fragmentor pin into engagement with the glass cylinder to fragmentize such cylinder and release the penetrator pin to initiate rupture of the diaphragm.

3 Claims, 3 Drawing Figures

PATENTED MAR 14 1972

3,648,898

INVENTOR.
Edward G. Day
BY
Herbert Furman
ATTORNEY

SENSOR AND TRIGGER MECHANISM

This invention relates generally to sensor and trigger mechanisms and more particularly to such mechanisms of the type including a hollow cylindrical glass member normally locating a biased diaphragm penetrating member out of engagement with a rupturable diaphragm of a pressure vessel containing fluid under pressure.

Generally the mechanism of this invention is an improvement over those shown in copending applications, Ser. No. 882,668 Zeigler et al., filed Dec. 5, 1969, Ser. No. 882,669 Fairchild et al., filed Dec. 5, 1969, and Ser. No. 86,895 Ranft, filed Nov. 4, 1970, all assigned to the assignee of this invention.

The mechanism of this invention includes a torsion spring mounted on a support and having a generally U-shaped lever arm which pivotally and slidably supports a fragmentor pin for the glass member. The fragmentor pin is slidably guided radially of the glass member by the support. A lever which seats a ball of predetermined weight on a conical pedestal includes a pair of extensions or abutments which straddle the fragmentor pin and engage the bight portion of the lever arm to either side thereof. The lever detents the lever arm against the torsion spring bias to locate the fragmentor pin out of engagement with the glass member and additionally serves to slidably locate the fragmentor pin with respect to the bight portion of the lever arm and align the fragmentor pin with the support guide.

It is, therefore, one of the features of this invention to provide an improved sensor and trigger mechanism wherein a fragmentor pin for fragmentizing a glass member to initiate rupture of the diaphragm of a pressure vessel is pivotally and slidably supported on the bight portion of a resiliently biased U-shaped swingable lever arm, with the arm being detented against movement by a lever which additionally slidably locates the fragmentor pin with respect to the bight portion and a guide for the fragmentor pin, the lever being released from the bight portion upon the occurrence of an acceleration pulse of predetermined amplitude and time.

This and other features of the mechanism of this invention will be readily apparent from the following specification and drawings wherein.

Figures 1, 2, 3:
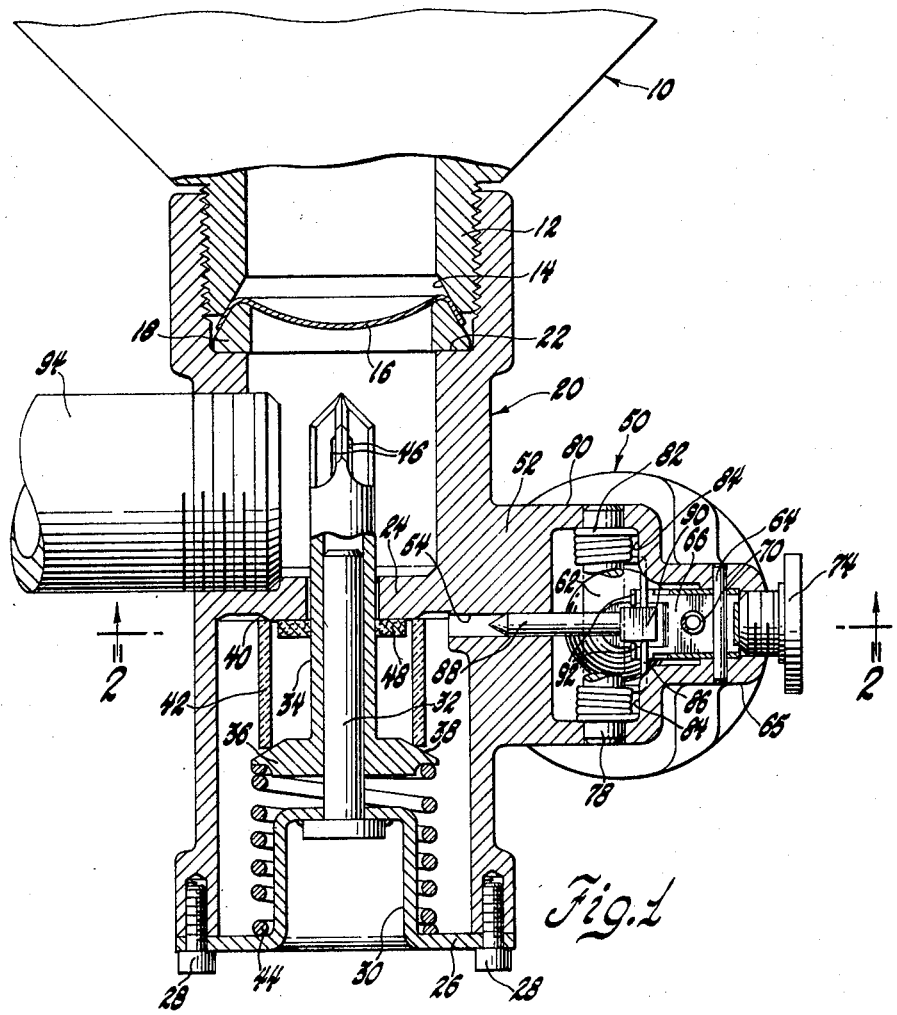
FIG. 1 is a partially broken away view of a sensor and trigger mechanism according to this invention.
FIG. 2 is a view taken generally along the plane indicated by line 2—2 of FIG. 1.
FIG. 3 is a view taken generally along the plane indicated by line 3—3 of FIG. 2.

Referring now particularly to FIG. 1 of the drawings, the mechanism includes a conventional pressure vessel 10 containing a compressible fluid, such as air or nitrogen, under pressure. The vessel 10 includes an externally threaded cylindrical outlet 12 having an axially and radially tapered end wall 14. A conventional domed metal diaphragm 16 includes a tapered peripheral flange which seats against wall 14 and also against the outer tapered wall of a cylindrical washer 18. A generally cylindrical support 20 includes an internally threaded end bore which receives the threaded outlet 12 of the pressure vessel 10 and includes a radial shoulder 22 which engages washer 18 to clamp the peripheral flange of the diaphragm 16 between the washer and wall 14 and thereby seal the pressure vessel 10.

Support 20 includes an apertured intermediate or radial wall 24. The other open end of the support 20 is closed by an end cap 26 which is bolted at a number of places at 28 to a thickened end wall portion of the support 20 and includes a cylindrical central embossment 30 which is apertured in axial alignment with the aperture of wall 24. The head of a guide pin 32 is secured to the base wall of embossment 30 and the shank of the pin extends through the opening in such base wall and through the opening in wall 24. The hollow shank of a penetrating pin 34 is slidably mounted on the shank of pin 32 and is slidably received in the opening of wall 24. The head 36 of pin 34 includes an axially and radially tapered cylindrical face 38 which opposes a like face 40 of wall 24. Faces 38 and 40 seat the open ends of a frangible glass cylinder 42, the details of which are set forth in the aforenoted copending applications. A coil compression spring 44 seats between the cap 26 and the head 36 of the penetrating pin to urge the penetrating pin upwardly as viewed in FIG. 1 and toward the diaphragm 16. The pin 34 is located or held against such bias by the glass cylinder 42. The free end of the pin 34 is fluted as shown, with the flutes being provided with sharpened edges. The flutes communicate with the interior of the pin 32 through openings 46 so that no vacuum is created between the guide pin 32 and the penetrating pin 34 when the penetrating pin moves relative to the guide pin. A cylindrical apertured felt washer 48 seats on wall 24 within the cylindrical face 40 to cushion stopping of the penetrating pin and to also seal the opening of wall 24.

An annular housing 50 is formed integral with the support 20 and joined thereto by a radial rib 52 provided with a cylindrical guide bore 54. As shown in FIG. 2, the open end of housing 50 is closed by an end cap 56 bolted at 58 to the annular wall of housing 50. The cap 56 includes a central, conically shaped pedestal seat 60 which seats a ball 62 of predetermined weight.

A pin 64 traverses the side walls of a generally U-shaped integral extension 65 of housing 50 and provides a pivotal support for a generally channel shaped lever 66. The base wall of the lever 66 includes an offset foot 68 which seats against the ball 62 generally diametrically opposite the seat 60. A coil compression spring 70 seating between a set screw 72 and the base wall of the lever 66, around an integral protuberance thereof, continually biases the lever 66 in a counterclockwise direction, as viewed in FIG. 2, to hold ball 62 on seat 60 with a predetermined force. Set screw 72 is threaded into an end wall of the extension 65 and may be adjusted to vary the force of spring 70. A thumb screw 74 is threaded into another end wall of extension 65 as shown in FIGS. 1 and 2 and includes an inset rubber washer 76, which may engage an arcuate portion of the base wall of lever 66, as shown in FIG. 2, to provide a blockout blocking any movement of the lever 66 despite movement of the ball 62 from seat 60, as will be described. The arcuate portion of the base wall of the lever 66 may be serrated to enhance the gripping action between the rubber washer and such base wall portion.

A pin 78 is received within the apertured side walls of another integral U-shaped extension 80 of the housing 50 which opens to extension 65. The spaced coils of a torsion spring 82 are received on the pin 78, with the coils being anchored against an end wall 84 of the extension 80. The torsion spring includes a generally U-shaped lever arm 86. The shank of a fragmentor pin 88 is slidably received within the bore 54 and the slotted head 90 of such pin is mounted on the bight portion of spring arm 86 to pivotally and slidably connect the spring arm and the fragmentor pin. As best shown in FIG. 3, the base wall of the lever 66 includes a spaced pair of lateral abutments or extensions 92 which engage the bight portion of spring arm 86 to either side of the slotted head 90 of the fragmentor pin to thereby both detent the spring arm 86 and likewise slidably locate the fragmentor pin 88 with respect to the bight portion of such spring arm and align the pin with respect to bore 54.

Upon receipt of an acceleration pulse of predetermined amplitude and time in the horizontal plane of FIG. 2, ball 62 will move from the seat 60 to its phantom line position shown therein. This releases the lever 66 for movement to its phantom line position shown therein. This assumes, of course, that the thumb screw 74 does not detent the lever 66. When the lever 66 moves to its phantom line position, extensions 92 move out of engagement with the bight portion of spring arm 86 so that the spring arm drives the pin 88 to its phantom line position in engagement with the glass cylinder 42 as shown. This fragmentizes the glass cylinder and releases the penetrator pin 34 to rupture the diaphragm 16 and release the contents of the pressure vessel for flow through the outlet 12 and also through an outlet conduit 94 to a mechanism to be inflated, such as a cushion of a vehicle body air restraint system.

Thus, this invention provides an improved sensor and trigger mechanism.

I claim:

1. In combination with a support, a pressure vessel containing pressure fluid and sealed by a penetratable seal, a penetrating member engageable with the seal to penetrate the seal and release the pressure fluid, means biasing the penetrating member into engagement with the seal, and a fragmentizable glass member blocking movement of the penetrating member into engagement with the seal, the improvement comprising, lever means swingably mounted on the support and including a lateral extension, a fragmentizing member pivotally and slidably mounted on the lateral extension for movement by the lever means into engagement with the glass member, means biasing the lever means in a direction to drive the fragmentizing member into engagement with the glass member to fragmentize the glass member and release the penetrating member, second lever means swingably mounted on the support, means on the second lever means engageable with the lateral extension to hold the first lever means against movement and to slidably locate the fragmentizing member relative to the lateral extension, means biasing the second lever means in a direction to move the means thereon out of engagement with the lateral extension and release the first lever means, and means responsive to receipt of an acceleration pulse of predetermined amplitude and time by the support for releasing the second lever means for movement under the bias thereon.

2. In combination with a support, a pressure vessel containing pressure fluid and sealed by a penetratable seal, a penetrating member engageable with the seal to penetrate the seal and release the pressure fluid, means biasing the penetrating member into engagement with the seal, and a fragmentizable glass member blocking movement of the penetrating member into engagement with the seal, the improvement comprising, torsional spring means mounted on the support and including a generally U-shaped lever arm swingably biased in one direction, a fragmentizing member pivotally and slidably mounted on the bight portion of the lever arm for movement by the lever arm into engagement with the glass member to fragmentize the glass member and release the penetrating member, lever means swingably mounted on the support, means on the lever means engageable with the bight portion to hold the lever arm against movement and to slidably locate the fragmentizing member relative to the bight portion, means biasing the lever means in a direction to move the means thereon out of engagement with the bight portion and release the lever arm, and means responsive to receipt of an acceleration pulse of predetermined amplitude and time by the support for releasing the lever means for movement under the bias thereon.

3. In combination with a support, a pressure vessel containing pressure fluid and sealed by a penetratable seal, a penetrating member engageable with the seal to penetrate the seal and release the pressure fluid, means biasing the penetrating member into engagement with the seal, and a fragmentizable glass member blocking movement of the penetrating member into engagement with the seal, the improvement comprising, a generally U-shaped lever swingably mounted on the support, an elongated fragmentizing member pivotally and slidably mounted on the bight portion of the lever and extending laterally therefrom, means biasing the lever in a direction to drive the fragmentizing member into engagement with the glass member to fragmentize the glass member and release the penetrating member, a second lever swingably mounted on the support and including a pair of abutments engageable with the bight portion to either side of the fragmentizing member to hold the first lever against movement and to slidably locate the fragmentizing member relative to the bight portion, means biasing the second lever in a direction to move the abutments out of engagement with the bight portion and release the first lever, and means responsive to receipt of an acceleration pulse of predetermined amplitude and time by the support for releasing the second lever for movement under the bias thereon.

* * * * *